(12) United States Patent
Li et al.

(10) Patent No.: US 9,826,513 B2
(45) Date of Patent: Nov. 21, 2017

(54) UPLINK REQUESTS FOR COMMUNICATION RESOURCES

(71) Applicant: Intel IP Corporation, Santa Clara, CA (US)

(72) Inventors: Qinghua Li, San Ramon, CA (US); Chittabrata Ghosh, Fremont, CA (US); Xiaogang Chen, Beijing (CN); Laurent Cariou, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/998,212

(22) Filed: Dec. 26, 2015

(65) Prior Publication Data

US 2017/0099671 A1    Apr. 6, 2017

Related U.S. Application Data

(60) Provisional application No. 62/237,283, filed on Oct. 5, 2015.

(51) Int. Cl.
*H04W 72/08* (2009.01)
*H04W 72/04* (2009.01)

(52) U.S. Cl.
CPC ..... *H04W 72/0413* (2013.01); *H04W 72/087* (2013.01)

(58) Field of Classification Search
CPC ................ H04W 72/085; H04W 72/0413
See application file for complete search history.

(56) References Cited

U.S. PATENT DOCUMENTS

2010/0220665 A1* 9/2010 Govindan ............... H04L 47/10
370/329
2017/0019863 A1* 1/2017 Cariou ................ H04W 52/283

* cited by examiner

*Primary Examiner* — Chuong A Ngo
(74) *Attorney, Agent, or Firm* — Eversheds Sutherland (US) LLP

(57) ABSTRACT

Uplink requests for bandwidth and/or other types of communication resources are provided. In some embodiments, a communication device can access a mapping between quality of service (QoS) metrics and communication resources. The communication device can determine a value of the QoS (e.g., a guaranteed rate, a defined traffic priority, an amount of buffered data, etc.) and can determine a communication resource element using at least the mapping and the value of the QoS metric. The communication device also can configure an uplink request for communication resources based at least on the communication resource element. In addition, the communication device can send the uplink request.

20 Claims, 10 Drawing Sheets

UPLINK REQUESTS FOR COMMUNICATION RESOURCES

BACKGROUND

This application is related to and claims priority from U.S. Provisional Patent Application No. 62/237,283, filed Oct. 5, 2015, the contents of which application are hereby incorporated by reference herein in their entirety.

BACKGROUND

In wireless environments, communication devices (e.g., access point devices, station devices, or the like) can be allocated communication resources, such as bandwidth for communication. Communication resources are finite. Therefore, in scenarios in which the upstream link (uplink) requests for communication resources exceeds the available resources and/or the uplink requests convey rich information related to operational conditions that may be pertinent to allocation of resources, the allocation of communication resources can determine whether the wireless environment efficiently utilizes the available resources. Satisfactory operation of the wireless environment ultimately depends on the efficient allocation of such resources.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are,described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
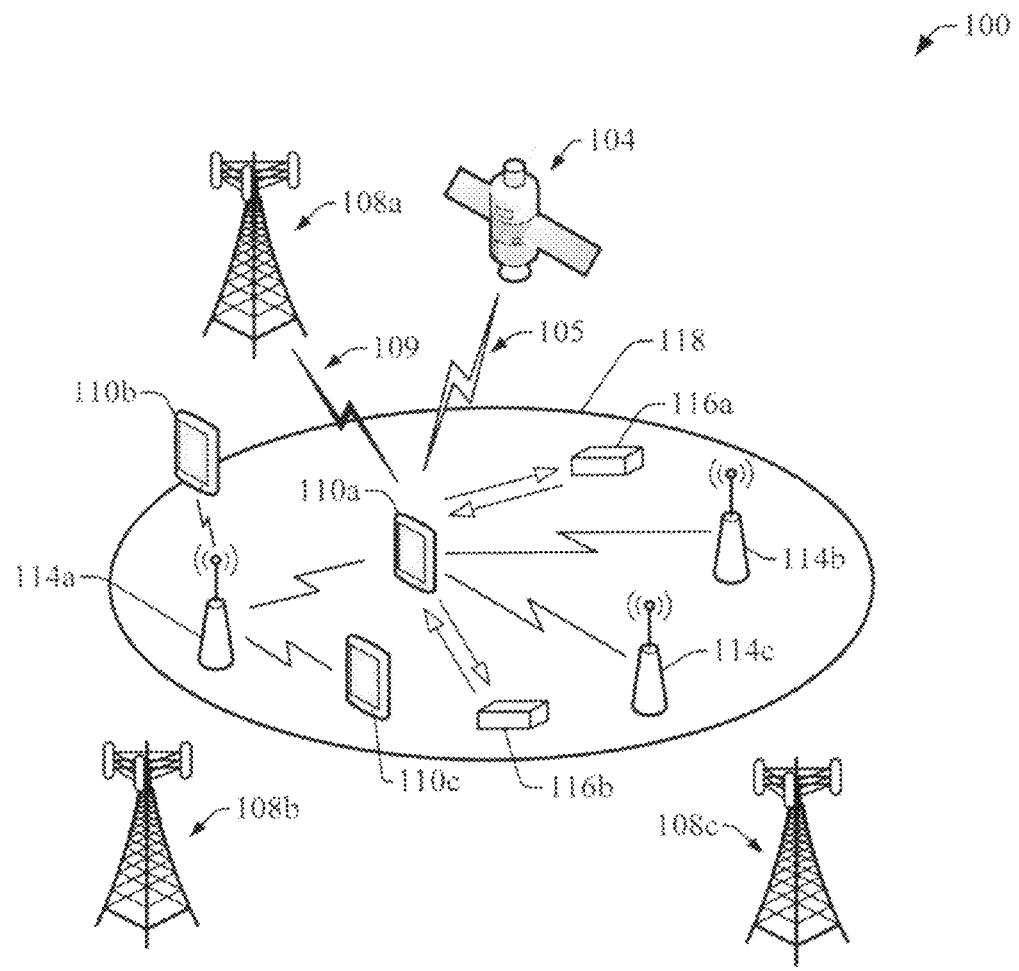
FIG. 1 illustrates an example of an operational environment for wireless communication in accordance with one or more embodiments of the disclosure.

The disclosure recognizes and addresses, in at least certain aspects, the issue of configuration of uplink (UL) requests for bandwidth and/or other communication resources and allocation of resources in response to such uplink requests. Besides bandwidth requests, the scheme is applicable to other types of requests and responses, e.g., submitting association requests and responding to a power save poll. While schemes for allocation of resources in response to uplink bandwidth requests can rely on static allocation of resources to improve efficiency, some user devices that are statically allocated resources may not have data for transmission in the uplink. In addition, information that may be pertinent to allocation of resources, such as quality of service (QoS) requirements or the like, may not be communicated in an uplink request for bandwidth. Instead, information that identifies a requesting user device is commonly provided in such a request. Embodiments of this disclosure permit configuration and/or generation of UL requests for communication resources. More specifically, yet not exclusively, some embodiments provide devices, systems, techniques, and/or computer program products for configuration and/or generation of uplink requests (such as UL requests for bandwidth) in a wireless communication environment. In some embodiments, rather than an access point (AP) device assigning statically a group of resource units (RUs) and codes (e.g., CREs) to user devices, embodiments of the disclosure permit that each requesting user device selects or otherwise determines its own RU and code from available resources in the RU and code domain. Therefore, at least such embodiments can avoid allocating resources to a whole group of user devices in instances in which a subset of the group of user devices requires uplink bandwidth. In addition or in other embodiments, QoS information can be mapped to RUs and codes. Thus, a requesting user device can select an RU and code according to its QoS configurations. To that end, embodiments of the disclosure provide mappings between QoS and RUs and codes, where a mapping can be signaled to the requesting user device from an AP. When the AP detects a transmitted signal power in the contention resource element in the RU and code domain, the AP not only knows the user device is requesting bandwidth, the AP also knows QoS requirement(s), such as urgency and payload size and request/response type, associated with the user device. It is noted that a contention resource element can be a resource unit in a frequency-time-code domain over which a device can send a signal to another device. For example, a CRE can be a spreading code jointly across the subcarriers of a resource unit (RU) in frequency and multiple OFDM symbols in time such as the long training field (LTF) sequence in the uplink multiuser MIMO (UL MU-MIMO) of the 802.11ax draft standard. While various embodiments of the disclosure are illustrated in connection with communication within a 20 MHz channel, it is noted that the disclosure is not limited in that respect and other channel bandwidths (40 MHz, 80 MHz, 160 MHz or 80+80

MHz) are contemplated. Further, the elements described herein in connection with UL requests for bandwidth and/or other communication resources can be implemented in wireless communications according to any radio technology protocol in which contention and/or backoff is implemented, not just Wi-Fi protocols, such as those of the Institute of Electrical and Electronics Engineers (IEEE) 802.11 family of standards.

The disclosure provides advantages over conventional approaches to UL requests. For example, at least some embodiments in accordance with this disclosure can permit configuration and/or transmission of UL requests (for bandwidth and/or other resources) that utilize fewer resources and send more information than conventional approaches. To that end, in some implementations, a mapping between QoS metrics and CREs can be utilized for to convey efficiently a request for and/or allocation of resources for a user device.

Glossary.—The following is a non-exclusive list of acronyms utilized in the present specification and annexed drawings: CTS: Clear to Send; DL: Downlink; HEW: High-Efficiency Wireless Local Area Network; ID: Identification; L-STF: Legacy Short Training Field; L-LTF: Legacy Long Training Field; L-SIG: Legacy Signal Field; MAC: Media Access Control; MPD: Mid-packet Detect (or Mid-Packet Detection); MU: Multi-user; PAID: Partial Access ID; PLCP: Physical Layer Convergence Protocol; PPDU: PLCP Protocol Data Unit; RTS: Ready to Send; and SS: Spatial Stream.

With reference to the drawings, FIG. 1 presents a block diagram of an example operational environment 100 for wireless communication in accordance with at least certain aspects of the disclosure. The operational environment 100 includes several telecommunication infrastructures and communication devices, which collectively can embody or otherwise constitute a telecommunication environment. More specifically, yet not exclusively, the telecommunication infrastructures can include a satellite system 104. As described herein, the satellite system 104 can be embodied in or can include a global navigation satellite system (GNSS), such as the Global Positioning System (GPS), Galileo, GLONASS (Globalnaya navigatsionnaya sputnikovaya sistema), BeiDou Navigation Satellite System (BDS), and/or the Quasi-Zenith Satellite System (QZSS). In addition, the telecommunication infrastructures can include a macro-cellular or large-cell system which is represented with three base stations 108a-108c; a micro-cellular or small-cell system, which is represented with three access points (or low-power base stations) 114a-114c; and a sensor-based system—which can include proximity sensor(s), beacon device(s), pseudo-stationary device(s), and/or wearable device(s)—represented with functional elements 116a-116b. As illustrated, in one implementation, each of the transmitter(s), receiver(s), and/or transceiver(s) included in respective computing devices (such as telecommunication infrastructure) can be functionally coupled (e.g., communicatively or otherwise operationally coupled) with the wireless device 110a (which, in some embodiments, may be referred to as a station (STA) device 110a) via wireless link(s) in accordance with specific radio technology protocols (e.g., IEEE 802.11a, IEEE 802.11ax, etc.) in accordance with aspects of this disclosure. For another example, a base station (e.g., base station 108a) can be functionally coupled to the wireless devices 110a, 110b, and 110c via communication links 109 that may include respective upstream wireless links (ULs) and a downstream link (DL) configured in accordance with a radio technology protocol for macro-cellular wireless communication (e.g., 3$^{rd}$ Generation Partnership Project (3GPP) Universal Mobile Telecommunication System (UMTS) or "3G," "3G"; 3GPP Long Term Evolution (LTE), or LTE); LTE Advanced (LTE-A)). For another example, the satellite system 104 may be functionally coupled to the wireless devices 110a, 110b, and 110c via communication links 105. For yet another example, an access point (e.g., access point 114a) can be functionally coupled to one or more of the wireless devices 110a, 110b, or 110c via a respective UL and DL configured in accordance with a radio technology protocol for small-cell wireless communication (e.g., femtocell protocols, Wi-Fi, and the like). For still another example, a beacon device (e.g., device 116a) can be functionally coupled to the wireless device 110a with a UL-only (ULO), a DL-only, or an UL and DL, each of such wireless links (represented with open-head arrows) can be configured in accordance with a radio technology protocol for point-to-point or short-range wireless communication (e.g., Zigbee, Bluetooth, or near field communication (NFC) standards, ultrasonic communication protocols, or the like).

In the operational environment 100, the small-cell system and/or the beacon devices can be contained in a confined area 118 that can include an indoor region (e.g., a commercial facility, such as a shopping mall) and/or a spatially-confined outdoor region (such as an open or semi-open parking lot or garage). The small-cell system and/or the beacon devices can provide wireless service to a device (e.g., wireless device 110a or 110b) within the confined area 118. For instance, the wireless device 110a can handover from macro-cellular wireless service to wireless service provided by the small-cell system present within the confined area 118. Similarly, in certain scenarios, the macro-cellular system can provide wireless service to a device (e.g., the wireless device 110a) within the confined area 118.

In certain embodiments, the wireless device 110a, as well as other communication devices (wireless or wireline) contemplated in the present disclosure, can include electronic devices having computational resources, including processing resources (e.g., processor(s)), memory resources (memory devices (also referred to as memory), and communication resources for exchange of information within the computing device and/or with other computing devices. Such resources can have different levels of architectural complexity depending on specific device functionality. Exchange of information among computing devices in accordance with aspects of the disclosure can be performed wirelessly as described herein, and thus, in one aspect, the wireless device 110a also can be referred to as wireless communication device 110a, wireless computing device 110a, communication device 110a, or computing device 110a interchangeably. The same nomenclature considerations apply to wireless device 110b and wireless device 110c. More generally, in the present disclosure, a communication device can be referred to as a computing device and, in certain instances, the terminology "communication device" can be used interchangeably with the terminology "computing device," unless context clearly dictates that a distinction should be made. In addition, a communication device (e.g., communication device 110a or 110b or 110c) that operates according to HEW can utilize or leverage a physical layer convergence protocol (PLCP) and related PLCP protocol data units (PPDUs) in order to transmit and/or receive wireless communications. Example of the computing devices that can communicate wirelessly in accordance with aspects of the present disclosure can include desktop computers with wireless communication resources; mobile computers, such as tablet computers, smartphones, notebook computers, laptop computers with wireless communication resources, Ultrabook™ computers; gaming consoles, mobile telephones; blade computers; programmable logic controllers; near field communication devices; customer premises equipment with wireless communication resources, such as set-top boxes, wireless routers, wireless-enabled television sets, or the like; and so forth. The wireless communication resources can include radio units (also referred to as radios) having circuitry for processing of wireless signals, processor(s), memory device(s), and the like, where the radio, the processor(s), and the memory device(s) can be coupled via a bus architecture.

The computing devices included in the example operational environment 100, as well as other computing devices contemplated in the present disclosure, can implement (e.g., configure or otherwise generate) UL requests for bandwidth and/or other communication resources, as described herein. It is noted that other functional elements (e.g., servers, routers, gateways, and the like) can be included in the operational environment 100. It is noted that the elements of this disclosure in connection with UL request for bandwidth and/or other types of communication resources can be implemented in any telecommunication environment including a wireline network (e.g., a cable network, an internet-protocol (IP) network, an industrial control network, any wide area network (WAN), a local area network (LAN), a personal area network (PAN), a sensor-based network, or the like); a wireless network (e.g., a cellular network (either small-cell network or macro-cell network), a wireless WAN (WWAN), a wireless LAN (WLAN), a wireless PAN (WPAN), a sensor-based network, a satellite network, or the like); a combination thereof; or the like.

Figure 2:
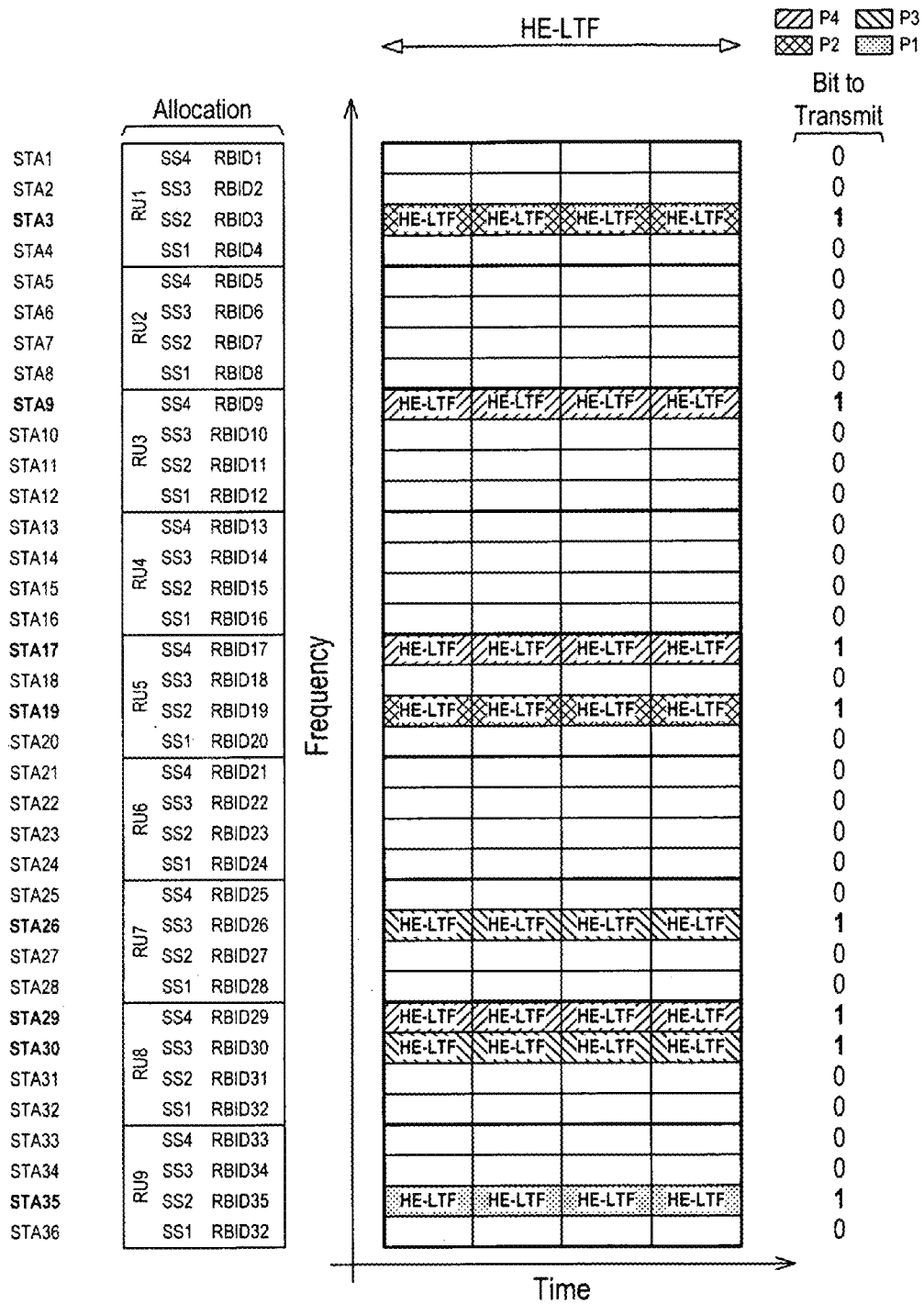
FIG. 2 illustrates an example of a scheme for uplink bandwidth requests in accordance with one or more embodiments of the disclosure.

FIG. 2 illustrates an example of a scheme for uplink bandwidth request. Compared to conventional approaches, the exemplified scheme improves operational efficiency of a wireless environment. In one aspect, the illustrated scheme statically assigns a frequency RU and a code to each user device (e.g., STA 110a, STA 110b, and STA 110c) according at least to a respective communication address of each of the user devices. In some embodiments, the number of user devices can be as large as two thousand, thus there may be not enough RUs and codes for each of the user devices and/or static allocation of RU(s) and code(s) can assign or otherwise associate resources to one or more user devices that are inactive in the uplink. As an illustration, when an AP device (e.g., AP 114a) acquires 20 user devices for bandwidth request transmissions, there may be up to 9×8=72 CREs, where "8" corresponds to the maximum number of spatial streams that can be supported or otherwise permitted by the AP device 114a. In addition, a user device that requests communication resources in the UL can identify itself to the AP device, without additional useful information. For instance, such a user device may not convey response type (e.g. power save poll response, clear channel assessment (CCA) response, association request) and/or QoS information (e.g., buffer size, traffic category, and/or waiting time) indicative or otherwise representative of a QoS setting of the user device.

Figure 3:
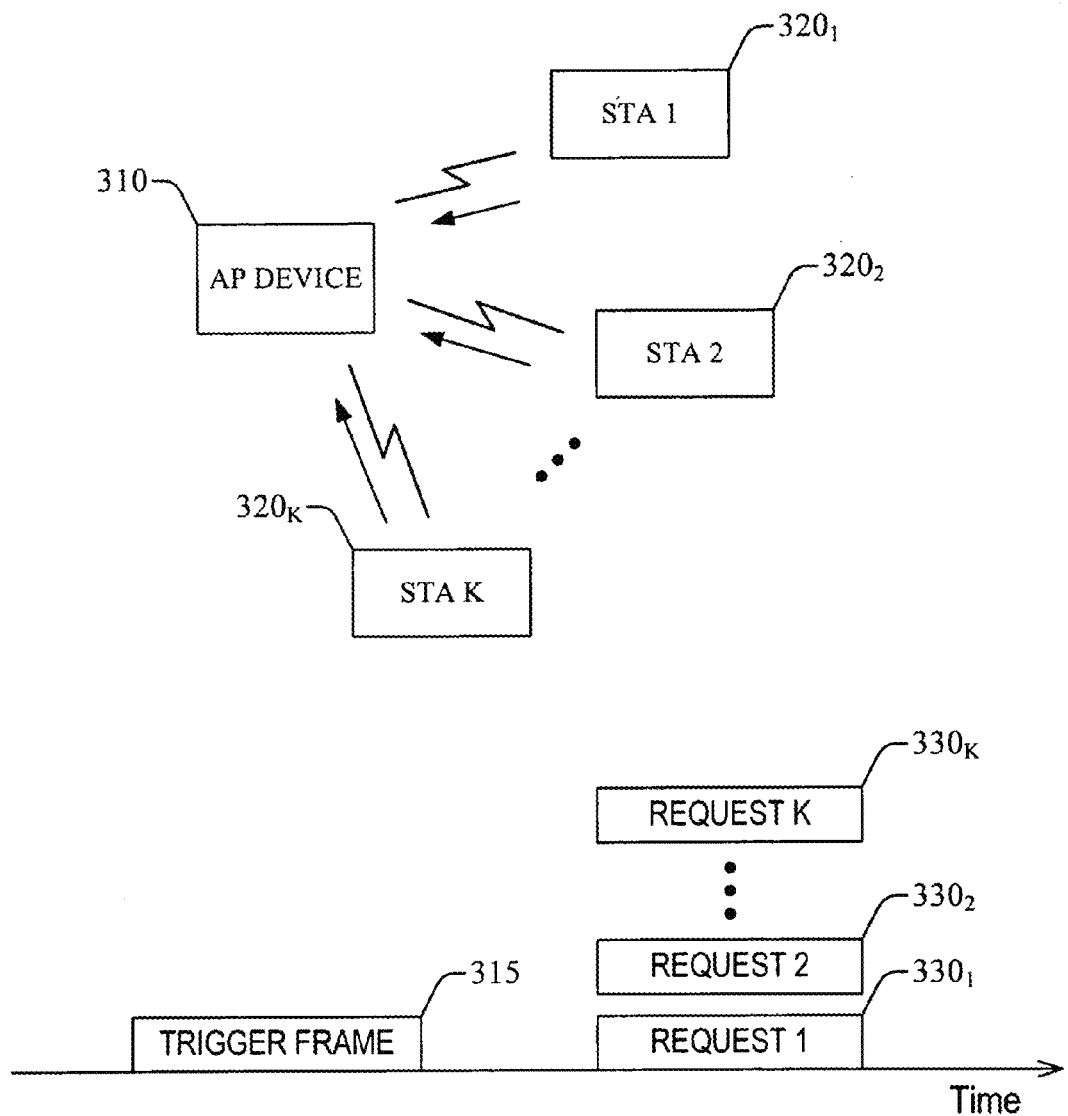
FIG. 3 illustrates an example of schematic uplink requests in accordance with one or more embodiments of the disclosure.

Embodiments of the disclosure can address such scenarios. When a user device (e.g., device 110a) intends to send uplink data, the user device can have at least two ways to access communication resources for sending the data. One way can include carrier sense multiple access (CSMA) channel contention in a distributed fashion. Another way can include contending within a period scheduled by an AP device, as illustrated in FIG. 3. More specifically, an AP device 310 can send a trigger frame 315 in order to solicit bandwidth requests from a group of user devices, including STA 1 $320_1$, STA 2 $320_2$ . . . STA K $320_K$, with K a natural number greater than one. The trigger frame can be replaced with a poll frame such as a power save poll. The trigger frame essentially allocates resources for the responses to be turned in. A user device (e.g., STA 2 $320_2$) of the group of user devices can have data to send and, thus, can transmit a signal (e.g., request $330_2$) in a contention resource element in a frequency-time-code domain to request a communication resource to send at least a portion of the data. The AP device 310 can receive the signal and detect signal power in the contention resource element and, in response, can allocate an uplink transmission resource in order to satisfy the request. Similarly, in scenarios in which each of the STAs $320_1$-$320_K$ have respective data to send in the UL, such user devices can transmit respective requests $330_1$-$330_k$ in respective contention resource elements in a frequency-time-code domain in order to request communication resources. Here, frequency-time-code domain refers to the domain formed by frequency, time, and code. In some aspects, a CRE can spread in the frequency domain, time domain, and code domain. It is noted that the frequency domain and time domain are fundamental, whereas the code domain can be formed over the frequency domain and time domain. The AP device 310 can receive one or more of the requests $330_1$, $330_2$, . . . and $330_K$, and can detect respective signal power in the respective CRE associated with the received request(s).

Figure 4A:
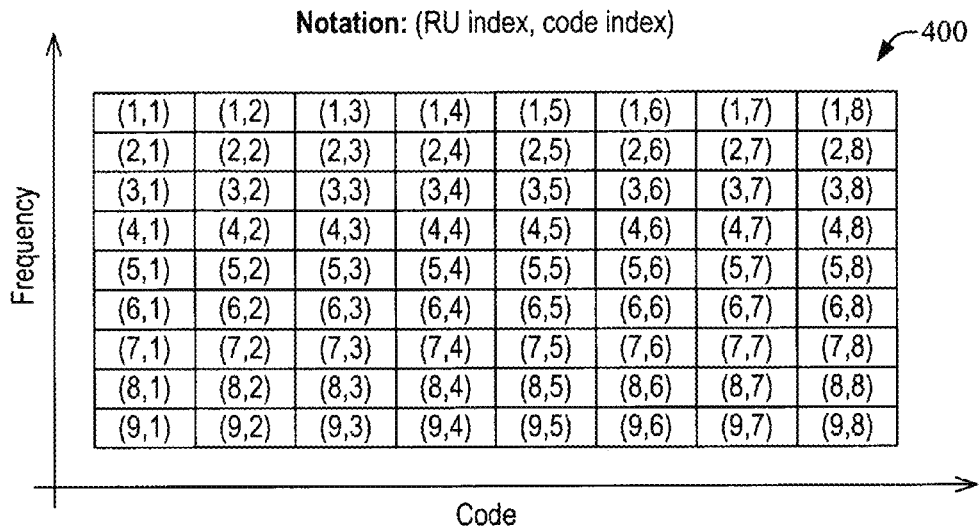
FIG. 4A illustrates an example of a trigger frame and simultaneous uplink requests (e.g., bandwidth requests) from user devices in accordance with one or more embodiments of the disclosure.

FIG. 4A illustrates CREs distributed in a frequency-time-code domain in accordance with one or more embodiments of the disclosure. In frequency, a communication channel having a spectral bandwidth $\Delta$ can be divided into resource units, each having a defined number of orthogonal frequency division multiplexing (OFDM) tones. For instance, a resource unit can include 4 OFDM tones, 8 OFDM tones, 16 OFDM tones, 13 OFDM tones, 26 OFDM tones, 52 OFDM tones, 56 OFDM tones, or the like. The allocation illustrated in FIG. 2 corresponds to a 20 MHz channel having 9 RUs and 26 tones per RU. The spectral bandwidth $\Delta$ can be expressed as a real number or a natural number in units of frequency. In one aspect, a requesting user device (e.g., STA 2 $320_2$) can send a request for communication resources (e.g., request $330_2$) over a selected or otherwise defined RU. In addition or in some embodiments, besides frequency division multiple access, frequency resources and/or time resources can be further divided or otherwise categorized according to orthogonal codes. In some aspects, the orthogonal codes can have a defined length, and can include a defined orthogonal set of bit sequences, Walsh codes, orthogonal Gold codes, Walsh-Hadamard codes, variable-length orthogonal codes, maximal length codes, P matrix codes, and the like. In some implementations, orthogonal codes can be applied across OFDM symbols in time and/or adjacent tones in frequency. Since two orthogonal code sets can be applied—with a first set being applied in the frequency domain and a second set being applied in the time domain—CREs may be organized and represented as triples: (RU index, time code index, frequency code index), where the RU index is indicative of a defined resource unit, the time code index is indicative of a code in a set of orthogonal codes, and the frequency code index is indicative of another code in another set of orthogonal codes. In an example scenario in which frequency codes are not used, the CREs may be organized and represented as doubles: (RU index, time code index). It is noted that, in some aspects of the disclosure, an orthogonal code can be partitioned into two orthogonal subcodes, where each subcode can be orthogonal to another subcode. It is further noted that, in general, the orthogonal code can be configured in frequency-time domain as a whole piece. More specifically, for example, orthogonality can be defined for the full length code.

Embodiments of the disclosure can efficiently utilize communication resources. Specifically, in some scenarios, one or more user devices may not have data to send at any defined time and, thus, there would be no need to allocate resources statically to each of the one or more user devices. As an example, a cell (e.g., the confined area 118 or another cell contained therein) can have 200 user devices, but at a defined time, only about 10 of those user devices may have uplink data for transmission in the uplink. It is noted that the number of user devices having data for transmission can be random, depending on the uplink traffic in the user devices, for example.

Without intending to be bound by standardized communication protocols, due to latency requirements, an AP device (e.g., AP device 114b or AP device 310) can serve a user device timely and may not wait until all or most all user devices within the cell have buffered uplink data for transmission in the uplink. In such a case, the AP device can allocate, for example, 30 CREs for the uplink user devices to contend for communication resources. Thus, although collisions may be present, the efficiency with respect to resource utilization can be greater than allocating 200 CREs, e.g., one per user device within the cell, for contention and/or transmission of UL requests for bandwidth and/or other communication resources.

Figure 4B:
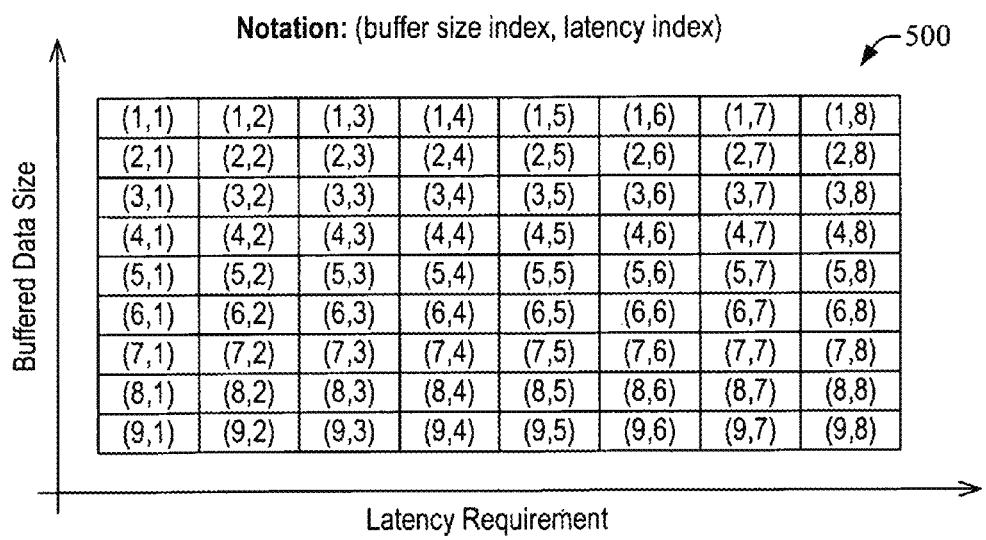
FIG. 4B illustrates an example of a mapping between quality of service (QoS) parameters and contention resource elements (CREs) for uplink requests in accordance with one or more embodiments of this disclosure.

In addition or in other embodiments, a mapping between QoS settings and CREs can be provided. As mentioned herein, regardless of the efficiency of resource utilization for UL requests, user devices can have different QoS requirements—e.g., categories of traffic, sizes of buffered data, latencies of the buffered data, a combination thereof, or the like. In some embodiments, a user device (e.g., device 110a or STA 1 $320_1$) can send QoS information in an UL request message (e.g., an UL bandwidth request message) requesting uplink communication resources, where the QoS information can include, for example, one or more parameters indicative or otherwise representative of a respective QoS setting. Transmission of such a request message can consume additional resources to send messages for respective requesting user devices. Therefore, in some embodiments, CREs can be divided or otherwise arranged according to QoS parameters indicative of one or more QoS settings. More specifically, in some implementations, a user device can select a CRE according to the user device's QoS requirement(s). For example, frequency resources can be mapped to a buffered data size and a time domain code can be mapped to a latency requirement. FIG. 4B illustrates such mapping, corresponding to CREs shown in FIG. 4. As described herein, an RU can be pictorially represented with a block labeled with a pair of indices q and s: (q, s), where q and s are natural numbers. In one implementation, an RU in lower frequency can correspond to a smaller buffered data size. For instance, block (7,3) in diagram 400 in FIG. 4A can correspond to block (7,3) in diagram 450 in FIG. 4B. In addition or in another implementation, the smaller the code index, the lower the latency requirement.

In some embodiments, a mapping between QoS requirements and CRE indices (e.g., RU index and code index) can be static or dynamic. In one implementation, an AP device (e.g., AP device 310) can dynamically acquire channels with different spectral bandwidths, e.g. 20 MHz, 40 MHz, 80 MHz, and 160 MHz, and can allocate different number of OFDM symbols in time domain for creating the CREs.

Figure 5A:
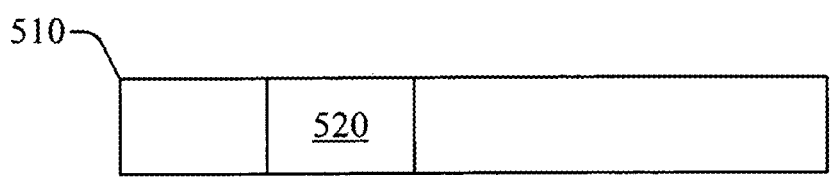
FIG. 5A illustrates an example of a trigger frame in accordance with one or more embodiments of the disclosure.
Figure 5B:
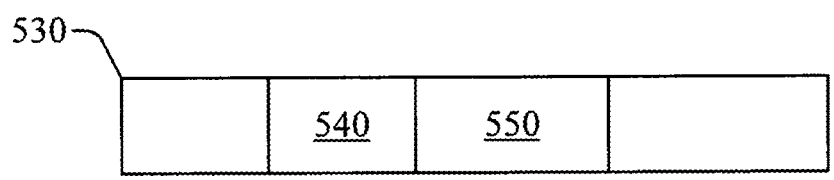
FIG. 5B illustrates another example of a trigger frame in accordance with one or more embodiments of the disclosure.

In some embodiments, 1-bit signaling can be included in a trigger frame (such as trigger frame 315) before an UL request for communication resources in order to indicate a static or dynamic mapping associated with QoS requirements. For instance, "0" may indicate a static mapping and "1" can indicate a dynamic mapping. FIG. 5A illustrates an example of a trigger frame 510 including a field 520 that can transport or otherwise convey the 1-bit signaling. In one example, the scaling factor can be transmitted in a defined field of the trigger frame. In another example, dynamic mapping may be always used. In this case, the indication bit for static and dynamic mapping is not needed. The standard may define the mapping between QoS requirements and each resource size, e.g., frequency bandwidth and number of OFDM symbols, such as 20 MHz and 4 OFDM symbols. After knowing the total allocated bandwidth and the number of OFDM symbols for the responses or requests, the station knows the mapping predefined. In an example scenario in which a static mapping associated with QoS requirements is indicated, a scaling factor mapped to 9 RUs, for example, can be implemented for buffered data indication. The scaling factor can be indicated or otherwise represented in a number of ways, including a multi-bit representation. For example, a 2-bit scaling factor can be utilized to represent a decade (or an increment in units of 10) of an amount of buffered data per RU. Specifically, each of the four scaling factors defines a mapping between buffered data sizes and RUs. For example, scaling factor="11" can be indicative or otherwise representative of the following associations or mappings: 1st RU can represent 10 KB or less of buffered data; 2nd RU can represent 20 KB or less of buffered data; 3rd RU can represent 40 KB or less of buffered data; or 4th RU can represent 80 KB or less of buffered data. For another example, scaling factor="11" can be indicative or otherwise representative of the following associations or mapping: 1st RU can represent 100 B or less of buffered data; 2nd RU can represent 200 B or less; 3rd RU can represent 400 B or less; and 4th RU can represent 800 B or less. The 2-bit scaling factor or any other types of scaling factors can be generated at an AP device during or prior to generation of a trigger frame. In some embodiments, such a scaling factor value can be indicated (or included) in the trigger frame. In one example, the scaling factor can be transmitted in a defined field of the trigger frame. In addition or in the alternative, another 2-bit scaling factor can be utilized for mapping a code index to a latency index, and the 2-bit scaling factor (and, thus, the related mapping) also can be indicated in the trigger frame. More generally, for a specific QoS category, an M-bit scaling factor (with M a natural number equal to or greater than 1) can be utilized to map a defined QoS requirement or magnitude associated with the QoS requirement to a code index, where the M-bit signaling can be included and transmitted in a trigger frame. FIG. 5B illustrates an example of a trigger frame 530 including a first field 540 and a second field 550 in accordance with one or more embodiments of the disclosure. The first field 540 can convey information indicative or otherwise representative of a static mapping between a QoS requirement and a resource item, such as a frequency block, a time block, or a code (e.g., an orthogonal code). In addition, the second field 550 can convey information indicative or otherwise representative of a definition of the static mapping. It is noted that, in some implementations, besides QoS requirements, the response or request types also can be mapped to the CREs. For example, a CRE is a for bandwidth request, another CRE is for a power save poll response and a third CRE is for CCA.

Therefore, in view of the signaling that can be transported or otherwise conveyed by a trigger frame, the number and/or the dimensions of the CREs assigned to a user device, by an AP device, can be different each time a resource allocation is implemented. The dimensions of the CREs are the total bandwidth and the number of OFDM symbols on which all the CREs of the burst can be sent. The user device may adaptively or dynamically map the QoS parameters of the user device to the CREs according to the CRE dimensions. In some embodiments, selection of a CRE can be deterministic. For example, the user device can select the CRE ($u_0$, $v_0$) for a same QoS input, e.g. buffered data size and/or traffic category, every time a communication resource is requested. In other embodiments, selection of the CRE can be random. Here $u_0$ and $v_0$ are natural numbers representing respective defined indices. Specifically, the user device may randomize the selection of the CRE for a same QoS input—e.g., the user device can select or otherwise determine CRE (2,4) in an allocation instance, and can further select other CRE codes around CRE ($u_0$, $v_0$) according to a probability distribution, in other allocation instances. The probability distribution permits randomization of the selection of CREs, and can be embodied in or can include any type of probability distribution, e.g., Gaussian distribution, Cauchy-Lorentz distribution, Poisson distribution, Laplace distribution, and the like. It is noted that, in some aspects, such a randomization can avoid constant or otherwise persistent collisions in CRE selection from contending user devices. In some embodiments, an AP device (e.g., AP device 310) can provide (e.g., generate and/or transmit) a 1-bit in a trigger frame (e.g., trigger frame 315) in order to indicate which of the deterministic CRE selection (e.g., the 1-bit can be equal to "0") or randomized CRE selection (e.g., the 1-bit can be equal to "1") the contending user device should use.

In some embodiments, two or three dimensions from frequency RU and codes can be used for different purposes and/or QoS settings, such as packet length, latency, backoff counter, and/or access category. In some implementations, the definition of how to use or otherwise apply such dimensions can be negotiated between an AP device and the user device, and/or can be advertised, by the AP device and/or the user device. In some aspects of such negotiation, the AP device can collect or otherwise access reports from user device in order to access their respective buffer sizes and/or traffic types. In response to the reports, the AP device can determine QoS parameters that can be more relevant than others. The AP device can determine relevancy in numerous ways, such as using rankings, historical information, user device profiles, a combination of the foregoing or the like. Upon or after a determination of relevant QoS parameters, the AP device can map the QoS parameters to respective CREs. In addition or in other implementations, such a definition can be advertised by the trigger frame.

In view that, in certain embodiments, the number of CREs can be less than the total number of user devices, collisions can occur. In one aspect, a collision can increase the latency for an uplink transmission, for example. In one embodiment, at least to address such a problem, a user device can account for a waiting period when computing or otherwise determine a QoS input, where the waiting period arises from increased latency due to one or more collisions. More specifically, in one example, a long delayed packet (e.g., a packet delayed by about 50 ms or more in a WLAN) may have a higher priority than a recent packet with the same payload size and traffic category. Thus, in one embodiment, the user device can select or otherwise determine, for example, a CRE according to a priority of buffered data. In some implementations, priorities for respective amounts of buffered data can be assigned to CREs in a similar fashion as that described herein in connection with mapping a QoS parameter to a CRE. There are numerous ways to calculate a priority of an amount of buffered data. In one example, proportional fair can be utilized to calculate a priority. The priority can be assigned to each CRE and a user device can select or otherwise determine, for example, a CRE according to such the priority that is calculated for a defined amount of buffered data. In some embodiments, selection or otherwise determination of CREs can be deterministic in accordance with aspects described herein. In other embodiments, selection or otherwise determination of the CREs can be randomized in accordance with various aspects described herein.

Figure 6:
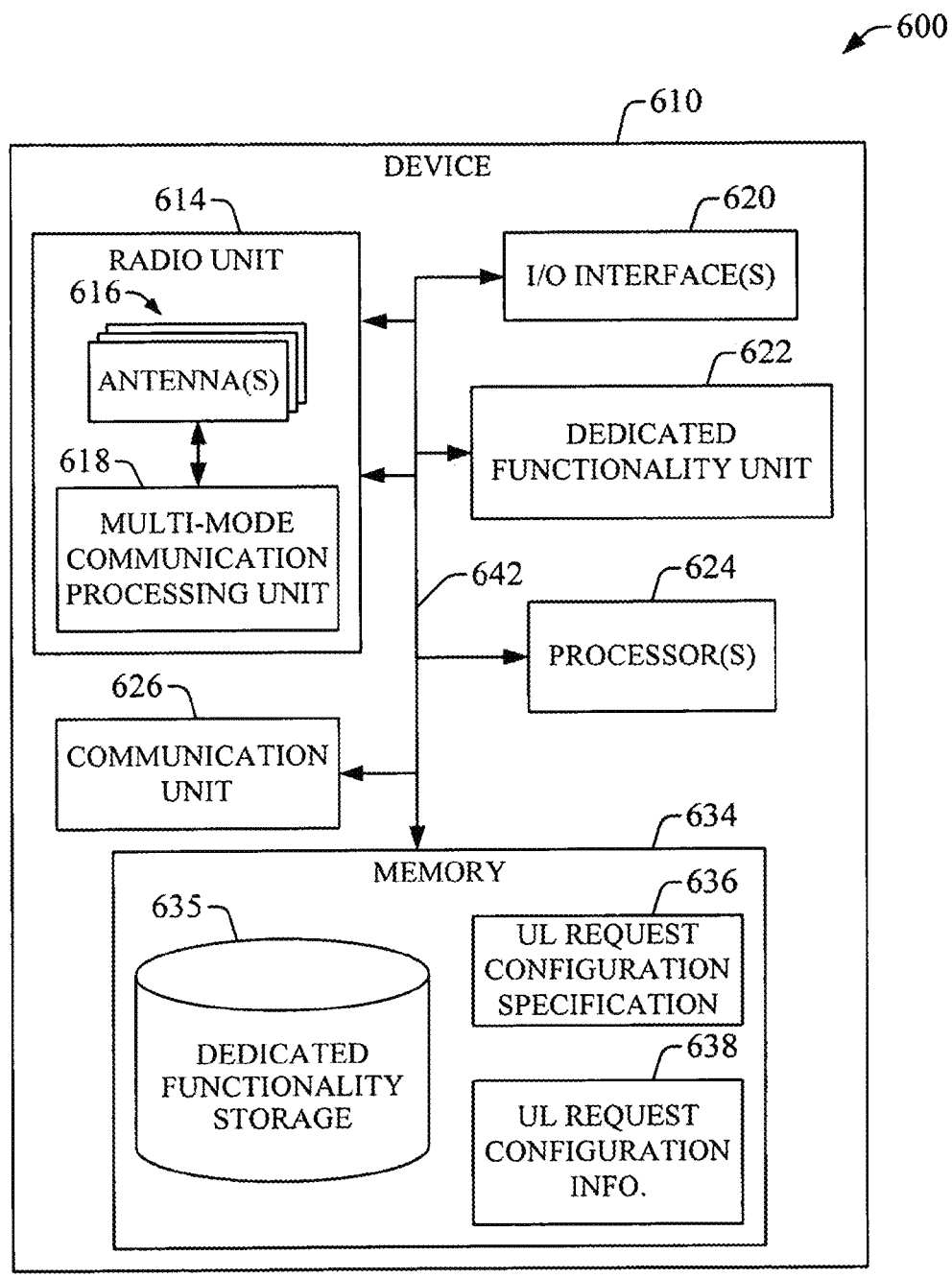
FIG. 6 presents an example of a communication device for wireless communication in accordance with one or more embodiments of the disclosure.

FIG. 6 illustrates a block-diagram of an example embodiment 600 of a communication device 610 that can operate in accordance with at least some aspects of the disclosure. The exemplified device 610 can include a communication device and can operate in accordance with at least some aspects of the disclosure, implementing UL LTFs as described herein, for example. Accordingly, in some embodiments, the device 610 can embody or can constitute any one of the devices in the operational environment 100, such as one of the AP devices 114a, 114b, or 114c, or one of the other illustrated devices. Thus, in some aspects, the device 610 can provide one or more specific functionalities—such as operating as a gateway device, a router device, or a sensor hub device; operating as a digital camera and generating digital images (e.g., static pictures and/or motion pictures); operating as a navigation device; operating as a biometric device (e.g., a heart rate monitor, a pressure monitor, a glucometer, an iris analyzer, a fingerprint analyzer, etc.); dosing and delivering an amount of a drug or other compound; operating as a sensor and sensing a defined physical quantity, such as temperature and/or pressure, or motion; operating as another sensor and sensing a compound in gas phase or liquid phase; operating as a controller for configuring a second defined physical quantity, managing energy, managing access to an environment, managing illumination and/or sound, regulating a defined process, such an automation control process, or the like; generating current, voltage, or other type of signal via inductive coils; a combination of the foregoing; a derivative functionality of the foregoing; or the like. To that end, the device 610 can include one or more functionality units 622 (referred to as dedicated functionality unit 622) that can include optical elements (e.g., lenses, collimators, light guides, light sources, light detectors (such as semiconductor light detectors), focusing circuitry, etc.); temperature sensors; pressure sensors; gas sensors; motion sensors, including inertial sensors (such as linear accelerator and/or a gyroscope); mechanical actuators (such as locks, valves, and the like); a combination of the foregoing; or the like.

In addition or in other aspects, a specific functionality of the device 610 can be provided or otherwise implemented via one or more processors 624. In some implementations, at least one of the processor(s) 624 can be integrated with dedicated functionality unit 622. In some implementations, at least one of the processor(s) (e.g., one or more of the processor(s) 624 or other processor(s)) can receive and operate on data and/or other type of information (e.g., analog signals) generated by components of the dedicated functionality unit 622. The at least one processor can execute a module in order to operate on the data and/or other type of information and, as a result, provide a defined functionality. The module can be embodied in or can include, for example, a software application stored in a memory device integrated into or functionally coupled to the device. For instance, the module can be retained in one or more memory devices 635 (collectively referred to as dedicated functionality storage 635), where the dedicated functionality storage 635 can be retained within one or more other memory devices (collectively referred to as memory 634). In addition or in other implementations, at least a second one of the processor(s) (e.g., one or more of processor(s) 624 or other processor(s) available to the dedicated functionality unit 622) can control the operation or duty cycle of a portion of the dedicated functionality unit 622 so as to collect data and/or other type of information; a combination of the foregoing; or the like. At least one of the units that constitute the dedicated functionality unit 622 can generate control signals (e.g., interruptions, alarms, or the like) and/or can cause the device 610 to transition between operational states in response to a defined condition of the device 610 or its environment. At least some of the control signals can be sent to an external device (not depicted in FIG. 6) via an I/O interface of the I/O interfaces 620. The type and/or number of components included in the dedicated functionality unit 622 can establish, at least in part, the complexity of the device 610. In some examples, the device 610 can embody or can constitute an AP device, and in other examples, the device 610 can embody or can constitute a SED or another type of IoT device.

The communication device 610 also can operate as a wireless device and, as mentioned, can embody or can constitute an access point device, a mobile computing device (e.g., user equipment or station device), or other types of communication devices (e.g., CPE) that can transmit and/or receive wireless communications in accordance with this disclosure. For example, the communication device 610 can embody the AP 310 or at least one of the stations STA 131 STA 1 320$_1$, STA 2 320$_2$ . . . STA K 320$_K$. In some aspects, to permit wireless communication, including UL requests for communication resources as described herein, the communication device 610 includes a radio unit 614 and a communication unit 626. In certain implementations, the communication unit 626 can generate packets or other types of information blocks via a network stack, for example, and can convey the packets or other types of information block to the radio unit 614 for wireless communication. In one embodiment, the network stack (not shown) can be embodied in or can constitute a library or other types of programming module, and the communication unit 626 can execute the network stack in order to generate a packet or other types of information block. Generation of the packet or the information block can include, for example, generation of control information (e.g., checksum data, communication address(es)), traffic information (e.g., payload data), and/or formatting of such information into a specific packet header.

As illustrated, the radio unit 614 can include one or more antennas 616 and a multi-mode communication processing unit 618. In certain embodiments, the antenna(s) 616 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 616 can be physically separated to leverage spatial diversity and related different channel characteristics associated with such diversity. In addition or in other embodiments, the multi-mode communication processing unit 618 that can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 602.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 618 also can process non-wireless signals (analogic, digital, a combination thereof, or the like).

Figure 7:
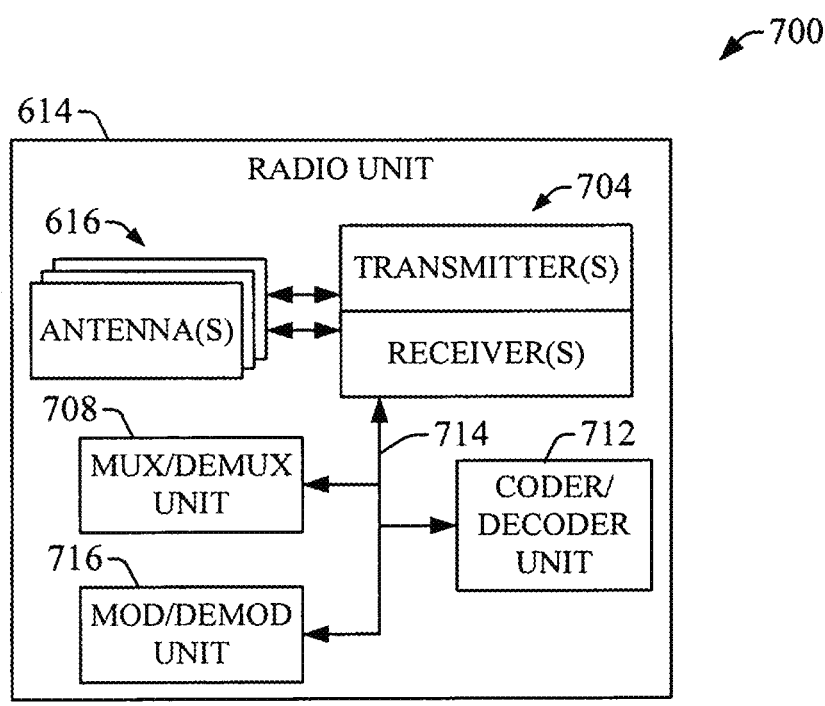
FIG. 7 presents an example of a radio unit for wireless communication in accordance with one or more embodiments of the disclosure.

In one embodiment, e.g., example embodiment 700 shown in FIG. 7, the radio unit 614 (as shown in FIG. 6) can comprise a set of one or more transmitters/receivers 704, and components therein (amplifiers, filters, analog-to-digital (A/D) converters, etc.), functionally coupled to a multiplexer/demultiplexer (mux/demux) unit 708, a modulator/demodulator (mod/demod) unit 716 (also referred to as modem 716), and a coder/decoder unit 712 (also referred to as codec 712). Each of the transmitter(s)/receiver(s) can form respective transceiver(s) that can transmit and receive wireless signal (e.g., electromagnetic radiation) via the one or more antennas 616. It is noted that in other embodiments, the multi-mode communication processing unit 618 can include other functional elements, such as one or more sensors, a sensor hub, an offload engine or unit, a combination thereof, or the like. While illustrated as separate blocks in the communication device 610, it is noted that in certain embodiments, at least a portion of the multi-mode communication processing unit 618 and the communication unit 626 can be integrated into a single unit (e.g., a single chipset or other type of solid state circuitry). In one aspect, such a unit can be configured by programmed instructions retained in the memory 634 and/or other memory devices integrated into or functionally coupled to the unit.

Electronic components and associated circuitry, such as mux/demux unit 708, codec 712, and modem 716 can permit or facilitate processing and manipulation, e.g., coding/decoding, deciphering, and/or modulation/demodulation, of signal(s) received by the commmunication device 610 and signal(s) to be transmitted by the communication device 610. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 704, can exchange information (e.g., data, metadata, code instructions, signaling and related payload data, combinations thereof, or the like) through a bus 714, which can embody or can comprise at least one of a system bus, an address bus, a data bus, a message bus, a reference link or interface, a combination thereof, or the like. Each of the one or more receivers/transmitters 704 can convert signal from analog to digital and vice versa. In addition or in the alternative, the receiver(s)/transmitter(s) 704 can divide a single data stream into multiple parallel data streams, or perform the reciprocal operation. Such operations may be conducted as part of various multiplexing schemes. As illustrated, the mux/demux unit 708 is functionally coupled to the one or more receivers/transmitters 704 and can permit processing of signals in time and frequency domain. In one aspect, the mux/demux unit 708 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 708 can scramble and spread information (e.g., codes) according to most any code, such as Hadamard-Walsh codes, Baker codes, Kasami codes, polyphase codes, and the like. The modem 716 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the communication, device 610 (e.g., processor(s) included in the radio unit 614 or other functional element(s) of the communication device 610) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 712 can operate on information (e.g., data, metadata, signaling, or a combination thereof) in accordance with one or more coding/decoding schemes suitable for communication, at least in part, through the one or more transceivers formed from respective transmitter(s)/receiver(s) 704. In one aspect, such coding/decoding schemes, or related procedure(s), can be retained as a group of one or more computer-accessible instructions (computer-readable instructions, computer-executable instructions, or a combination thereof) in one or more memory devices 634 (referred to as memory 634). In a scenario in which wireless communication among the communication device 610 and another computing device (e.g., a station or other types of user equipment) utilizes MIMO, MISO, SIMO, or SISO operation, the codec 712 can implement at least one of space-time block coding (STBC) and associated decoding, or space-frequency block (SFBC) coding and associated decoding. In addition or in the alternative, the codec 712 can extract information from data streams coded in accordance with spatial multiplexing scheme. In one aspect, to decode received information (e.g., data, metadata, signaling, or a combination thereof), the codec 712 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 712 can utilize, at least in part, mux/demux unit 708 and mod/demod unit 716 to operate in accordance with aspects described herein.

With further reference to FIG. 6, the communication device 610 can operate in a variety of wireless environments having wireless signals conveyed in different electromagnetic radiation (EM) frequency bands. To at least such end, the multi-mode communication processing unit 618 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

The communication device 610 can receive and/or transmit information encoded and/or modulated or otherwise processed in accordance with aspects of the present disclosure. To at least such an end, in certain embodiments, the communication device 610 can acquire or otherwise access information wirelessly via the radio unit 614 (also referred to as radio 614), where at least a portion of such information can be encoded and/or modulated in accordance with aspects described herein. As illustrated, in certain embodiments, the communication device 610 can include one or more memory elements 636 (referred to UL request configuration specification 636) that can include information defining or otherwise specifying type of mapping (e.g., static mapping or dynamic mapping) between QoS metrics and CREs or other types of communication resources; other associations between a QoS parameter and a CRE or another type of communication resource; specification of scaling factors (or parameters); a combination thereof; or the like. In addition or in other embodiments, the UL request configuration specification 636 can specify instructions and/or other information (e.g., data, such as parameters (e.g., scaling factors) and/or signaling) for implementation (e.g., configuration, generation, and/or transmission) of UL request for bandwidth or other type of communication resources, as described herein. In addition, the communication device 610, via the communication unit 626, for example, can determine and/or configure UL requests for communication resources according to instructions or other information retained in one or more memory elements 638 (referred to as UL request configuration information 638).

The memory 634 can contain one or more memory elements having information suitable for processing information received according to a predetermined communication protocol (e.g., IEEE 802.11ac or IEEE 802.11ax). While not shown, in certain embodiments, one or more memory elements of the memory 634 can include computer-accessible instructions that can be executed by one or more of the functional elements of the communication device 610 in order to implement at least some of the functionality for implementation of UL requests for bandwidth and/or other types of communication resources in wireless communication in accordance with aspects described herein. One or more groups of such computer-accessible instructions can embody or can constitute a programming interface that can permit communication of information (e.g., data, metadata, and/or signaling) between functional elements of the communication device 610 for implementation of such functionality.

As illustrated, the communication device 610 can include one or more I/O interfaces 620. At least one of the I/O interface(s) 620 can permit the exchange of information between the communication device 610 and another computing device and/or a storage device. Such an exchange can be wireless (e.g., via near field communication or optically-switched communication) or wireline. At least another one of the I/O interface(s) 620 can permit presenting information visually, aurally, and/or via movement to an end-user of the communication device 610. In one example, a haptic device can embody the I/O interface of the I/O interface(s) 620 that permit conveying information via movement. In addition, in the illustrated communication device 610, a bus architecture 642 (also referred to as bus 642) can permit the exchange of information (e.g., data, metadata, and/or signaling) between two or more functional elements of the communication device 610. For instance, the bus 642 can permit exchange of information between two or more of (i) the radio unit 614 or a functional element therein, (ii) at least one of the I/O interface(s) 620, (iii) the communication unit 626, or (iv) the memory 634. In addition, one or more application programming interfaces (APIs) (not depicted in FIG. 6) or other types of programming interfaces can permit the exchange of information (e.g., data and/or metadata) between two or more of the functional elements of the communication device 610. At least one of such API(s) can be retained or otherwise stored in the memory 634. In certain embodiments, it is noted that at least one of the API(s) or other programming interfaces can permit the exchange of information within components of the communication unit 626. The bus 642 also can permit a similar exchange of information. In certain embodiments, the bus 642 can embody or can include at least one of a system bus, an address bus, a data bus, a message bus, a reference link or interface, a combination thereof, or the like. In addition or in other embodiments, the bus 642 can include, for example, components for wireline and wireless communication.

It is noted that portions of the communication device 610 can embody or can constitute an apparatus. For instance, the multi-mode communication processing unit 618, the communication unit 626, at least one of the processor(s) 624, and at least a portion of the memory 634 can embody or can constitute an apparatus that can operate in accordance with one or more aspects of this disclosure. Specifically, in some embodiments, such an apparatus can include at least one memory device having programmed instructions, and at least one processor functionally coupled to the at least one memory device and configured to execute the programmed instructions, and in response to execution of the programmed instructions, the at least one processor is further configured to perform or facilitate various operations associated with the UL requests for communication resources in accordance with aspects of the present disclosure. For instance, the at least one processor can be configured to access a mapping between quality of service (QoS) metrics and communication resources; determine a value of a QoS metric; and determine a communication resource element using at least the mapping and the value of the QoS metric. The communication resource element can be a predetermined communication resource element corresponding to the value of the QoS metric, for example. It is noted, however, that the CRE is not so limited and it can correspond to other communication resources. In some implementations, to determine the communication resource element, the at least one processor can be further configured to select the communication resource element randomly according to a probability distribution of determining two or more indices corresponding to respective communication resources. The at least one memory device, e.g., the UL request configuration information 638 can include information representative or otherwise indicative of the probability distribution and/or selection rule(s).

In some aspects, the programmed instructions can be included in the UL request configuration specification 636, and the at least one processor can execute such instructions and/or leverage information retained in the UL request configuration information 638 in order to access such a mapping and/or determine such a CRE. In addition or in other aspects, the at least one processor can be configured or otherwise arranged to configure an uplink request for the communication resource element in accordance with aspects of the present disclosure, as describe herein.

As mentioned, the apparatus also can include the radio unit 614, which can be configured to send or can send the uplink request, and the communication unit 626 that can be configured to receive a trigger frame including an indication of a type of the mapping or the mapping. The type of the mapping can include one of a static mapping or a dynamic mapping, and wherein to access the mapping, the at least one processor is further configured to receive the indication. As described herein, in some aspects, the indication comprises at least one bit, and wherein the communication unit is further configured to decode a field in the trigger frame, the field conveying the at least one bit. In addition or in some embodiments the trigger frame can include a second indication representative of the mapping. The second indication can include, for example, two or more bits, and the communication unit can be further configured to decode a second field in the trigger frame, the field conveying the two or more bits.

Figure 8:
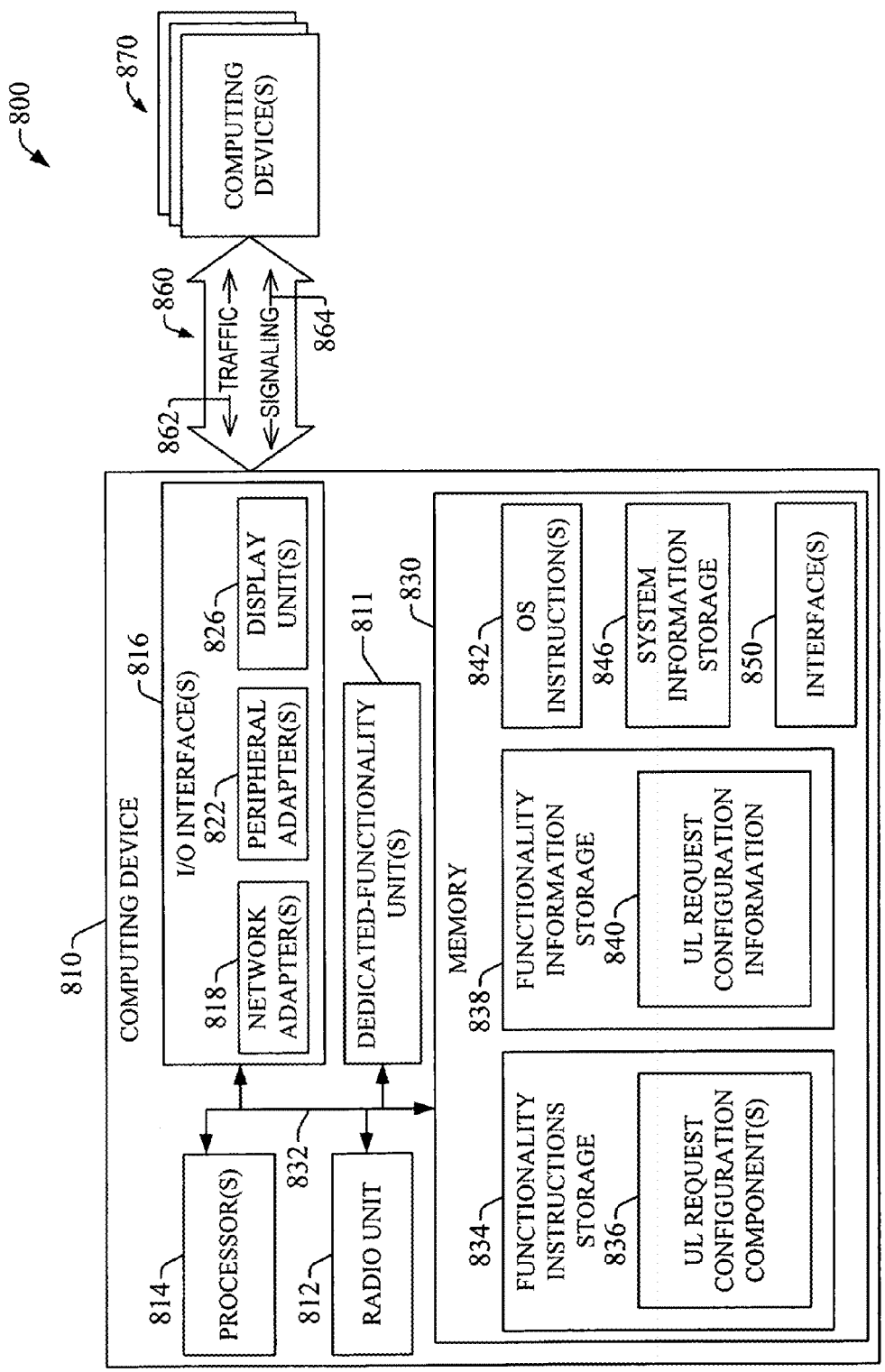
FIG. 8 presents an example of a computational environment for wireless communication in accordance with one or more embodiments of the disclosure.

FIG. 8 illustrates an example of a computational environment 800 for wireless communication in accordance with one or more aspects of the disclosure. The example computational environment 800 is only illustrative and is not intended to suggest or otherwise convey any limitation as to the scope of use or functionality of such computational environments' architecture. In addition, the computational environment 800 should not be interpreted as having any dependency or requirement relating to any one or combination of components illustrated in this example computational environment. The illustrative computational environment 800 can embody or can include, for example, the computing device 810, one or more of the base stations 114*a*, 114*b*, or 114*c*, AP 310 and/or any other computing devices (e.g., STA 1 320$_1$, STA 2 320$_2$, STA K 320$_K$, device 110*a*, device 110*b*, and/or communication device 610) that can implement or otherwise leverage the elements described herein in connection with UL requests for bandwidth and/or other types of communication resources.

The computational environment 800 represents an example of a software implementation of the various aspects or features of the disclosure in which the processing or execution of operations described in connection with the implementation of UL requests for bandwidth and/or other types of communication resources in wireless communications in accordance with aspects described herein can be performed in response to execution of one or more software components at the computing device 810. It is noted that the one or more software components can render the computing device 810, or any other computing device that contains such components, a particular machine for implementation (e.g., configuration, generation, and/or transmission) in wireless communication in accordance with aspects described herein, among other functional purposes. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method, at least the portion of the computer-accessible instructions can be persisted (e.g., stored, made available, or stored and made available) in a computer storage non-transitory medium and executed by a processor. The one or more computer-accessible (or processor-accessible) instructions that embody a software component can be assembled into one or more program modules, for example, that can be compiled, linked, and/or executed at the computing device 810 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 810 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the elements of implementation of UL requests for communication resources can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 810 can comprise one or more processors 814, one or more input/output (I/O) interfaces 816, a memory 830, and a bus architecture 832 (also termed bus 832) that functionally couples various functional elements of the computing device 810. As illustrated, the computing device 810 also can include a radio unit 812. In one example, similarly to the radio unit 614, the radio unit 812 can include one or more antennas and a communication processing unit that can permit wireless communication between the computing device 810 and another device, such as one of the computing device(s) 870. The computing device 810 also can include, in at least some embodiments, a dedicated functionality unit 811 that can provide specific functionality to the computing device 810, similarly to the dedicated functionality unit 622 described hereinbefore. As such, the structure and at least some of the functional elements of the dedicated functionality unit 811 can be similar to those of the dedicated functionality 622. The bus 832 can include at least one of a system bus, a memory bus, an address bus, or a message bus, and can permit exchange of information (data, metadata, and/or signaling) between the processor(s) 814, the I/O interface(s) 816, and/or the memory 830, or respective functional element therein. In certain scenarios, the bus 832 in conjunction with one or more internal programming interfaces 850 (also referred to as interface(s) 850) can permit such exchange of information. In scenarios in which processor(s) 814 include multiple processors, the computing device 810 can utilize parallel computing.

The I/O interface(s) 816 can permit or otherwise facilitate communication of information between the computing device and an external device, such as another computing device, e.g., a network element or an end-user device. Such communication can include direct communication or indirect communication, such as exchange of information between the computing device 810 and the external device via a network or elements thereof. As illustrated, the I/O interface(s) 816 can comprise one or more of network adapter(s) 818, peripheral adapter(s) 822, and display unit(s) 826. Such adapter(s) can permit or facilitate connectivity between the external device and one or more of the processor(s) 814 or the memory 830. In one aspect, at least one of the network adapter(s) 818 can couple functionally the computing device 810 to one or more computing devices 870 via one or more traffic and signaling pipes 860 that can permit or facilitate exchange of traffic 862 and signaling 864 between the computing device 810 and the one or more computing devices 870. Such network coupling provided at least in part by the at least one of the network adapter(s) 818 can be implemented in a wired environment, a wireless environment, or both. Therefore, it is noted that, in certain embodiments, the functionality of the radio unit 812 can be provided by a combination of at least one of the network adapter(s) 818 and at least one of the processor(s) 814. Accordingly, in such embodiments, the radio unit 812 may not be included in the computing device 810. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 870 can have substantially the same architecture as the computing device 810. In addition or in the alternative, the display unit(s) 826 can include functional elements (e.g., lights, such as light-emitting diodes; a display, such as liquid crystal display (LCD), combinations thereof, or the like) that can permit control of the operation of the computing device 810, or can permit conveying or revealing operational conditions of the computing device 810.

In one aspect, the bus 832 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 832, and all buses described herein can be implemented over a wired or wireless network connection and each of the subsystems, including the processor(s) 814, the memory 830 and memory elements therein, and the I/O interface(s) 816 can be contained within one or more remote computing devices 870 at physically separate locations, connected through buses of this form, in effect implementing a fully distributed system.

The computing device 810 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 810, and can comprise, for example, both volatile and non-volatile media, and removable and/or non-removable media. In one aspect, the memory 830 can comprise computer-readable media in the form of volatile memory, such as random access memory (RAM), and/or non-volatile memory, such as read only memory (ROM).

The memory 830 can comprise functionality instructions storage 834 and functionality information storage 838. The functionality instructions storage 834 can comprise computer-accessible instructions that, in response to execution (by at least one of the processor(s) 814), can implement one or more of the functionalities of the disclosure. The computer-accessible instructions can embody or can comprise one or more software components illustrated as UL request configuration component(s) 836. In one scenario, execution of at least one component of the UL request configuration component(s) 836 can implement one or more of the techniques disclosed herein in connection with the configuration of uplink for communication resources. For instance, such execution can cause a processor that executes the at least one component to carry out the disclosed methods, including the example method in FIG. 10. It is noted that, in some aspects, a processor of the processor(s) 814 that executes at least one of the UL request configuration component(s) 836 can retrieve information from or retain information in a memory UL request configuration information 840 in the functionality information storage 838 in order to operate in accordance with the functionality programmed or otherwise configured by the UL request configuration component(s) 836. Such information can include at least one of code instructions, information structures, or the like. At least one of the one or more interfaces 850 (e.g., application programming interface(s)) can permit or facilitate communication of information between two or more components within the functionality instructions storage 834. The information that is communicated by the at least one interface can result from implementation of one or more operations in a method of the disclosure. In certain embodiments, one or more of the functionality instructions storage 834 and the functionality information storage 838 can be embodied in or can comprise removable/non-removable, and/or volatile/non-volatile computer storage media.

At least a portion of at least one of the UL request configuration component(s) 836 or UL request configuration information 840 can program or otherwise configure one or more of the processors 814 to operate at least in accordance with the functionality described herein in connection with configuration of UL requests for communication resources. One or more of the processor(s) 814 can execute at least one of such components and leverage at least a portion of the information in the storage 838 in order to provide UL requests for bandwidth and/or other types of communication resources in accordance with one or more aspects described herein. More specifically, yet not exclusively, execution of one or more of the component(s) 836 can permit transmitting and/or receiving information at the computing device 810, where the at least a portion of the information can include signaling indicative or otherwise representative of a mapping between QoS metric(s) and communication resources (e.g., CREs); other signaling indicative of a type of mapping (e.g., static mapping or dynamic mapping); yet other signaling indicative of approach to selection of communication resources (e.g., deterministic selection or random selection); a combination thereof or the like, in accordance with aspects of this disclosure. As such, it is noted that in certain embodiments, a combination of the processor(s) 814, the UL request configuration component(s) 836, and the UL request configuration information 840 can form means for providing specific functionality for implementation of UL requests for bandwidth and/or other communication resources in wireless communications in accordance with one or more aspects of the disclosure.

It is noted that, in certain scenarios, the functionality instruction(s) storage 834 can embody or can comprise a computer-readable non-transitory storage medium having computer-accessible instructions that, in response to execution, cause at least one processor (e.g., one or more of processor(s) 814) to perform a group of operations comprising the operations or blocks described in connection with the disclosed techniques for implementation of UL requests for bandwidth and/or other communication resources, such as the example method 1000 presented in FIG. 10.

In addition, the memory 830 can comprise computer-accessible instructions and information (e.g., data and/or metadata) that permit or facilitate operation and/or administration (e.g., upgrades, software installation, any other configuration, or the like) of the computing device 810. Accordingly, as illustrated, the memory 830 can comprise a memory element 842 (labeled OS instruction(s) 842) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 810 can dictate a suitable OS. The memory 830 also comprises a system information storage 846 having data and/or metadata that permits or facilitate operation and/or administration of the computing device 810. Elements of the OS instruction(s) 842 and the system information storage 846 can be accessible or can be operated on by at least one of the processor(s) 814.

It should be recognized that while the functionality instructions storage 834 and other executable program components, such as the operating system instruction(s) 842, are illustrated herein as discrete blocks, such software components can reside at various times in different memory components of the computing device 810, and can be executed by at least one of the processor(s) 814. In certain scenarios, an implementation of the UL request configuration component(s) 836 can be retained on or transmitted across some form of computer readable media.

The computing device 810 and/or one of the computing device(s) 870 can include a power supply (not shown), which can power up components or functional elements within such devices. The power supply can be a rechargeable power supply, e.g., a rechargeable battery, and it can include one or more transformers to achieve a power level suitable for operation of the computing device 810 and/or one of the computing device(s) 870, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 818) to connect operationally to the conventional power grid. In another aspect, the power supply can include an energy conversion component, such as a solar panel, to provide additional or alternative power resources or autonomy for the computing device 810 and/or one of the computing device(s) 870.

The computing device 810 can operate in a networked environment by utilizing connections to one or more remote computing devices 870. As an illustration, a remote computing device can be a personal computer, a portable computer, a server, a router, a network computer, a peer device or other common network node, and so on. As described herein, connections (physical and/or logical) between the computing device 810 and a computing device of the one or more remote computing devices 870 can be made via one or more traffic and signaling pipes 860, which can comprise wireline link(s) and/or wireless link(s) and several network elements (such as routers or switches, concentrators, servers, and the like) that form a PAN, a LAN, a WAN, a WPAN, a WLAN, and/or a WWAN. Such networking environments are conventional and commonplace in dwellings, offices, enterprise-wide computer networks, intranets, local area networks, and wide area networks.

It is noted that portions of the computing device 810 can embody or can constitute an apparatus. For instance, at least one of the processor(s) 814; at least a portion of the memory 830, including a portion of the UL request configuration component(s) 836 and a portion of the UL request configuration information 840; and at least a portion of the bus 832 can embody or can constitute an apparatus that can operate in accordance with one or more aspects of this disclosure.

Figure 9:
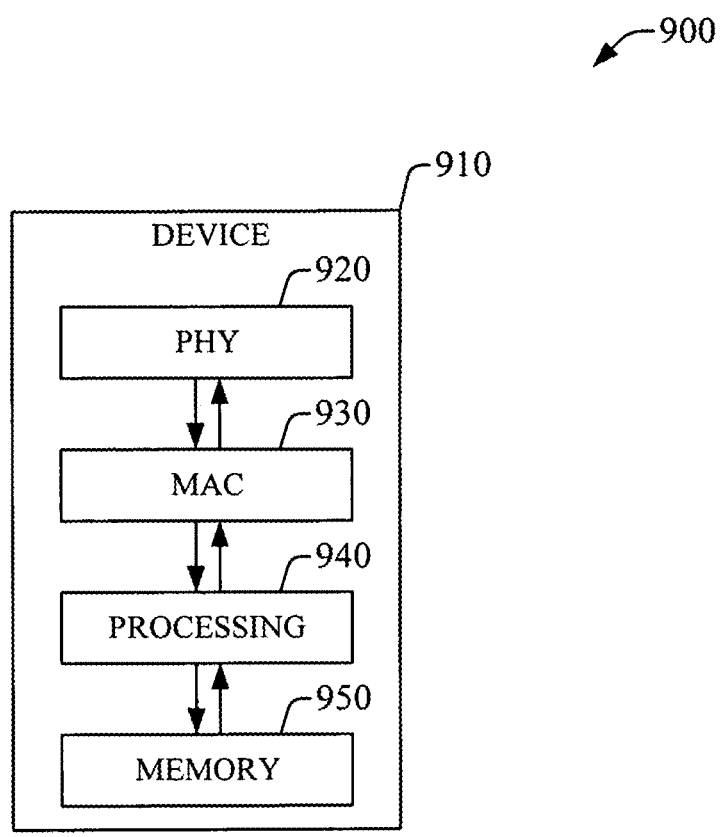
FIG. 9 presents another example of a communication device for wireless communication in accordance with one or more embodiments of the disclosure.

FIG. 9 presents another example embodiment 900 of a communication device 910 in accordance with one or more embodiments of the disclosure. The communication device 910 can embody or can include, for example, one of the communication devices 110*a*, 110*b*, 110*c*, STA 1 320$_1$, STA 2 320$_2$, STA K 320$_K$; one or more of the base stations 114*a*, 114*b*, 114*c*, AP 310; and/or any other computing device (e.g., communication device 610) that implements or otherwise leverages the elements described herein in connection with UL requests for bandwidth and/or other types of communication resources. In certain embodiments, the communication device 910 can be a HEW-compliant device that may be configured to communicate with one or more other HEW devices and/or other types of communication devices, such as legacy communication devices. HEW devices and legacy devices also may be referred to as HEW stations (HEW STAs) and legacy STAs, respectively. In one implementation, the communication device 910 can operate as an access point (such as AP 114*a*, 114*b*, or 114*c*). As illustrated, the communication device 910 can include, among other things, physical layer (PHY) circuitry 920 and medium-access-control layer (MAC) circuitry 930. In one aspect, the PHY circuitry 920 and the MAC circuitry 930 can be HEW compliant layers and also can be compliant with one or more legacy IEEE 802.11 standards. In one aspect, the MAC circuitry 930 can be arranged to configure physical layer converge protocol (PLCP) protocol data units (PPDUs) and arranged to transmit and receive PPDUs, among other things. In addition or in other embodiments, the communication device 910 also can include other hardware processing circuitry 940 (e.g., one or more processors) and one or more memory devices 950 configured to perform the various operations described herein.

In certain embodiments, the MAC circuitry 930 can be arranged to contend for a wireless medium during a contention period to receive control of the medium for the HEW control period and configure an HEW PPDU. In addition or in other embodiments, the PHY circuitry 920 can be arranged to transmit the HEW PPDU. The PHY circuitry 920 can include circuitry for modulation/demodulation, upconversion/downconversion, filtering, amplification, etc. As such, the communication device 910 can include a transceiver to transmit and receive data such as HEW PPDU. In certain embodiments, the hardware processing circuitry 940 can include one or more processors. The hardware processing circuitry 940 can be configured to perform functions based on instructions being stored in a memory device (e.g., RAM or ROM) or based on special purpose circuitry. In certain embodiments, the hardware processing circuitry 940 can be configured to perform one or more of the functions described herein, such as allocating bandwidth or receiving allocations of bandwidth.

In certain embodiments, one or more antennas may be coupled to or included in the PHY circuitry 920. The antenna(s) can transmit and receive wireless signals, including transmission of HEW packets or other type of radio packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 950 can retain or otherwise store information for configuring the other circuitry to perform operations for configuring and transmitting HEW packets or other types of radio packets, and performing the various operations described herein including, for example, implementation (e.g., configuration, generation, and/or transmission) of UL requests for communication resources (e.g., bandwidth) in accordance with one or more embodiments of this disclosure.

The communication device 910 can be configured to communicate using OFDM communication signals over a multicarrier communication channel. More specifically, in certain embodiments, the communication device 910 can be configured to communicate in accordance with one or more specific radio technology protocols, such as the IEEE family of standards including IEEE 802.11, IEEE 802.11n, IEEE 802.11ac, IEEE 802.11ax, DensiFi, and/or proposed specifications for WLANs. In one of such embodiments, the communication device 910 can utilize or otherwise rely on symbols having a duration that is four times the symbol duration of IEEE 802.11n and/or IEEE 802.11ac. It is noted that the disclosure is not limited in this respect and, in certain embodiments, the communication device 910 also can transmit and/or receive wireless communications in accordance with other protocols and/or standards.

The communication device 910 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other types of communication device that may receive and/or transmit information wirelessly. Similarly to the computing device 810, the communication device 910 can include, for example, one or more of a keyboard, a display, a non-volatile memory port, multiple antennas, a graphics processor, an application processor, speakers, and other mobile device elements. The display may be an LCD screen including a touch screen.

It is noted that while the communication device 910 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors. It is also noted that portions of the communication device 910 can embody or can constitute an apparatus. For instance, the processing circuitry 940 and the memory 950 can embody or can constitute an apparatus that can operate in accordance with one or more aspects of this disclosure. The apparatus also can include functional elements (e.g., a bus architecture and/or API(s) as described herein) that can permit exchange of information between the processing circuitry 940 and the memory 950.

In view of the aspects described herein, various techniques for implementing UL requests for communication resources in wireless communications by devices that can communicate wirelessly according to different communication protocols can be implemented in accordance with the disclosure. One example of such techniques can be better appreciated with reference, for example, to the flowchart in FIG. 10. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It is noted that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer- or machine-readable medium, to implement the one or more methods. The code instructions can provide a computer-executable or machine-executable framework to implement the techniques described herein.

Figure 10:
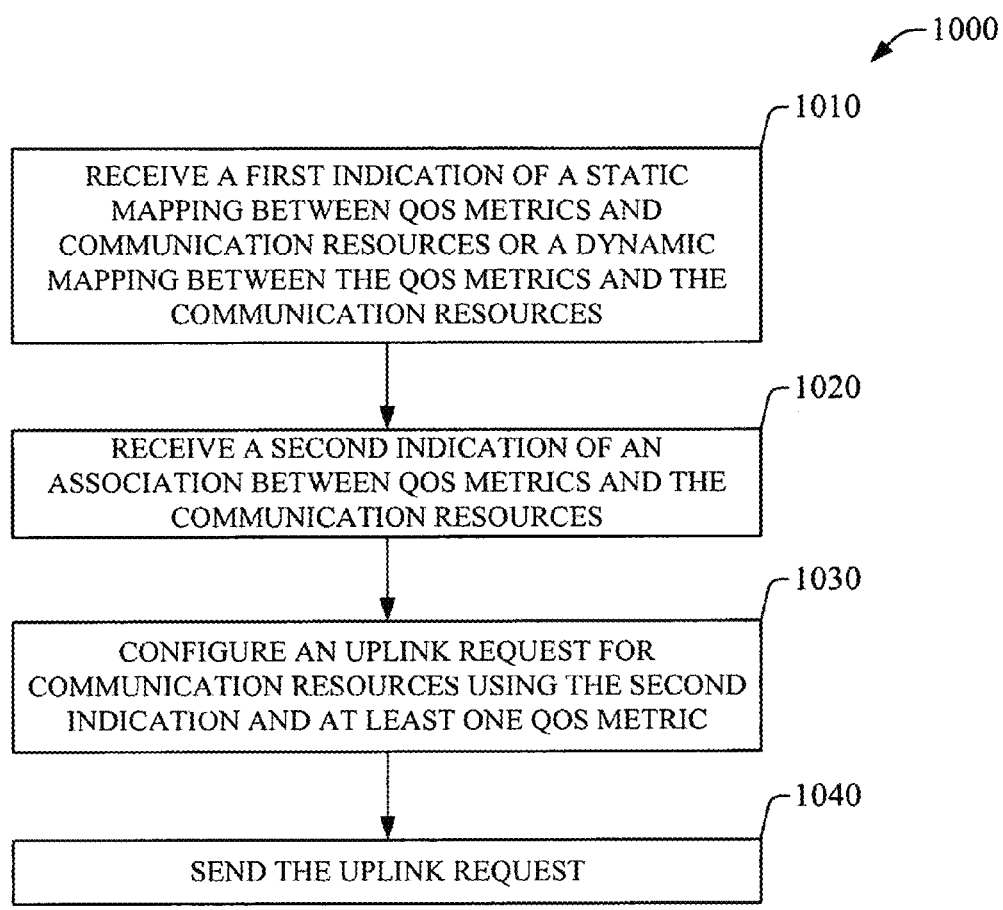
FIG. 10 presents an example method for uplink requests in accordance with one or more embodiments of the disclosure.

FIG. 10 presents a flowchart of an example method 1000 for configuration of UL requests in accordance with one or more embodiments of the present disclosure. A communication device (e.g., a station) in accordance with aspects of the disclosure can implement (e.g., execute) the subject example method in its entirety or in part. For example, the communication device 610, the computing device 810, or the communication device 910 can implement one or more blocks of the subject example method. It is noted that, in one aspect, the communication device can operate as a transmitter device (or a transmitter) when implementing the subject example method.

While illustrated with reference to a communication device, it is noted that the example method 1000 also can be implemented by other types of apparatuses or devices in accordance with one or more aspects of the present disclosure. For example, one of such apparatuses can include at least one memory device having programmed instructions encoded thereon and at least one processor functionally coupled to the at least one memory and configured to execute the programmed instructions, where in response to execution of the programmed instructions, the at least one processor can perform one or more blocks of the example method 1000. For another example, another one of such apparatuses can include circuitry assembled in a chipset (such as an ASIC or another type of processor) configured to implement (e.g., execute) at least the operations described in the example method 1000.

At block 1010, the communication device (e.g., STA 320$_2$ or device 1101D) or a component therein can receive a first indication of a static mapping between QoS metrics and communication resources or a dynamic mapping between the QoS metrics and the communication resources. At block 1020, the communication device or a component therein can receive a second indication of an association between QoS metrics and the communication resources. As described herein, the first indication and the second indication can be embodied in or can include respective groups of one or more bits conveyed in a trigger frame sent by an access point functionally coupled (e.g., communicatively coupled) to the communication device.

At block 1030, the communication device can configure an UL request for communication resources using the second indication and at least one QoS metric (e.g., buffer size, packet size, fairness metrics, QoS category, a combination thereof, or the like) associated with the communication device. At block 1040, the communication device can send the UL request.

According to example embodiments of the disclosure, there may be an apparatus for wireless telecommunication. The apparatus may include at least one memory device having programmed instructions. The at least one processor may be functionally coupled to the at least one memory device and configured to execute the programmed instructions. In response to execution of the programmed instructions, the at least one processor is further configured at least to: access a mapping between quality of service (QoS) metrics and communication resources; determine a value of a QoS metric; determine a communication resource element using at least the mapping and the value of the QoS metric; and configure an uplink request for the communication request. In example embodiments, the at least one processor may be further configured to send the uplink request. In further example embodiments, the communication resource element is predetermined communication resource element corresponding to the value of the QoS metric. In still further example embodiments, to determine the communication resource element, the at least one processor may be further configured to select the communication resource element randomly according to a probability distribution of determining two or more indices corresponding to respective communication resources. In addition or in other embodiments, to access the mapping, the apparatus can include a communication unit that may be further configured to receive a trigger frame including an indication of a type of the mapping or the mapping. In some aspects, the type can include one of a static mapping or a dynamic mapping. In addition or in further embodiments, the indication may include at least one bit and the communication unit may be further configured to decode a field in the trigger frame, the field conveying the at least one bit. Further or in yet other embodiments, the trigger frame can include a second indication representative of the mapping. In some further example embodiments, the second indication can include two or more bits and the communication unit may be further configured to decode a second field in the trigger frame, the field conveying the two or more bits.

According to example embodiments of the disclosure, there may be a method for wireless telecommunication. The method may include accessing a mapping between quality of service (QoS) metrics and communication resources; determining a value of a QoS metric; determining a communication resource element using at least the mapping and the value of the QoS metric; and configuring an uplink request for the communication request. In example embodiments the method may further include sending the uplink request. In further example embodiments, the communication resource element is predetermined communication resource element corresponding to the value of the QoS metric. In still further example embodiments, determining the communication resource element includes selecting the communication resource element randomly according to a probability distribution of determining two or more indices corresponding to respective communication resources. In some further example embodiments, accessing the mapping includes receiving a trigger frame including an indication of a type of the mapping or the mapping. In some further example embodiments, the type is one of a static mapping or a dynamic mapping. In some further example embodiments, the indication includes at least one bit and the method may further include decoding a field in the trigger frame, the field conveying the at least one bit. In some further example embodiments, the trigger frame further includes a second indication representative of the mapping. In some further example embodiments, the second indication may include two or more bits, and the method may further include decoding a second field in the trigger frame, the field conveying the two or more bits.

According to example embodiments of the disclosure, there may be a computer-readable non-transitory storage medium that contains instructions, which when executed by one or more processors, result in performing operations for wireless telecommunication including: accessing a mapping between quality of service (QoS) metrics and communication resources; determining a value of a QoS metric; determining a communication resource element using at least the mapping and the value of the QoS metric; and configuring an uplink request for the communication request. In example embodiments the medium may further include sending the uplink request. In further example embodiments, the communication resource element is predetermined communication resource element corresponding to the value of the QoS metric. In still further example embodiments, determining the communication resource element includes selecting the communication resource element randomly according to a probability distribution of determining two or more indices corresponding to respective communication resources. In some further example embodiments, accessing the mapping includes receiving a trigger frame including an indication of a type of the mapping or the mapping. In some further example embodiments, the type is one of a static mapping or a dynamic mapping. In some further example embodiments, the indication includes at least one bit and the medium may further include decoding a field in the trigger frame, the field conveying the at least one bit. In some further example embodiments, the trigger frame further includes a second indication representative of the mapping. In some further example embodiments, the second indication may include two or more bits, and the medium may further include decoding a second field in the trigger frame, the field conveying the two or more bits.

According to example embodiments of the disclosure, there may be an apparatus for wireless telecommunication. The apparatus may include means for: accessing a mapping between quality of service (QoS) metrics and communication resources; determining a value of a QoS metric; determining a communication resource element using at least the mapping and the value of the QoS metric; and configuring an uplink request for the communication request. In example embodiments the apparatus may further include means for sending the uplink request. In further example embodiments, the communication resource element is predetermined communication resource element corresponding to the value of the QoS metric. In still further example embodiments, the means for determining the communication resource element includes means for selecting the communication resource element randomly according to a probability distribution of determining two or more indices corresponding to respective communication resources. In some further example embodiments, the means for accessing the mapping includes means for receiving a trigger frame including an indication of a type of the mapping or the mapping. In some further example embodiments, the type is one of a static mapping or a dynamic mapping. In some further example embodiments, the indication includes at least one bit and the apparatus may further include means for decoding a field in the trigger frame, the field conveying the at least one bit. In some further example embodiments, the trigger frame further includes a second indication representative of the mapping. In some further example embodiments, the second indication may include two or more bits, and the apparatus may further include means for decoding a second field in the trigger frame, the field conveying the two or more bits.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "platform," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "platform," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that provide uplink requests for bandwidth and/or other communication resources. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. An apparatus for wireless telecommunication, comprising:
    at least one memory device having programmed instructions; and
    at least one processor functionally coupled to the at least one memory device and configured to execute the programmed instructions, and in response to execution of the programmed instructions, the at least one processor is further configured at least to:
        access a mapping between quality of service (QoS) metrics and communication resources;
        determine a value of a QoS metric;
        determine a communication resource element using at least the mapping and the value of the QoS metric; and
        configure an uplink request for the communication resource element, the uplink request configured for transmission to an access point device.

2. The apparatus of claim 1, further comprising a radio unit configured to send the uplink request.

3. The apparatus of claim 1, wherein the communication resource element is a predetermined communication resource element corresponding to the value of the QoS metric.

4. The apparatus of claim 1, wherein to determine the communication resource element, the at least one processor is further configured to select the communication resource element randomly according to a probability distribution of determining two or more indices corresponding to respective communication resources.

5. The apparatus of claim 1, further comprising a communication unit configured to receive a trigger frame including an indication of a type of the mapping or the mapping.

6. The apparatus of claim 5, wherein the type of the mapping comprises one of a static mapping or a dynamic mapping, and wherein to access the mapping, the at least one processor is further configured to receive the indication.

7. The apparatus of claim 5, wherein the indication comprises at least one bit, and wherein the communication unit is further configured to decode a field in the trigger frame, the field conveying the at least one bit.

8. The apparatus of claim 5, wherein the trigger frame further includes a second indication representative of the mapping.

9. The apparatus of claim 8, wherein the second indication comprises two or more bits, and wherein the communication unit is further configured to decode a second field in the trigger frame, the second field conveying the two or more bits.

10. The apparatus of claim 5, further comprising a radio unit coupled to the communication unit, wherein the radio unit is configured to receive wireless signals according to a defined radio technology protocol.

11. The apparatus of claim 10, further comprising one or more antennas functionally coupled to the radio unit.

12. At least one computer-readable non-transitory storage medium having instructions encoded thereon that, in response to execution, cause at least one processor to perform or facilitate operations comprising:
    receiving, at an apparatus, from an access point device, an indication of a mapping between quality of service (QoS) metrics and communication resources;
    configuring an uplink request for communication using the indication and at least one QoS metric associated with the apparatus; and
    sending the uplink request to the access point device.

13. The at least one computer-readable non-transitory storage medium of claim 12, the operations further comprising receiving a second indication of one of static mapping between the QoS metrics and the communication resources or dynamic mapping between the QoS metrics and the communication resources.

14. The at least one computer-readable non-transitory storage medium of claim 13, wherein receiving the indication or the second indication comprises receiving a trigger frame including the indication or the second indication.

15. The at least one computer-readable non-transitory storage medium of claim 14, wherein the indication comprises at least one bit.

16. The at least one computer-readable non-transitory storage medium of claim 15, wherein the operations further comprise decoding a field in the trigger frame, the field conveying the at least one bit.

17. The at least one computer-readable non-transitory storage medium of claim 14, wherein the second indication comprises two or more bits, and wherein the operations further comprise decoding a second field in the trigger frame, the second field conveying the two or more bits.

18. A device, comprising:
    circuitry configured at least to:
        receive, from an access point device, an indication of a mapping between quality of service (QoS) metrics and communication resources;

configure an uplink request for communication using the indication and at least one QoS metric associated with the device; and send the uplink request to the access point device.

19. The device of claim 18, wherein the circuitry is further configured to decode a trigger frame including the indication, and wherein the indication comprises one or more bits indicative of a mapping between a defined QoS metric and a contention resource element.

20. The device of claim 19, wherein the circuitry is further configured to receive a second indication of one of static mapping between the QoS metrics and the communication resources or dynamic mapping between the QoS metrics and the communication resources.

* * * * *